Nov. 24, 1936. C. E. JOHNSON 2,061,874
METHOD OF VALVE STEM PACKING
Filed Sept. 10, 1934  2 Sheets—Sheet 1
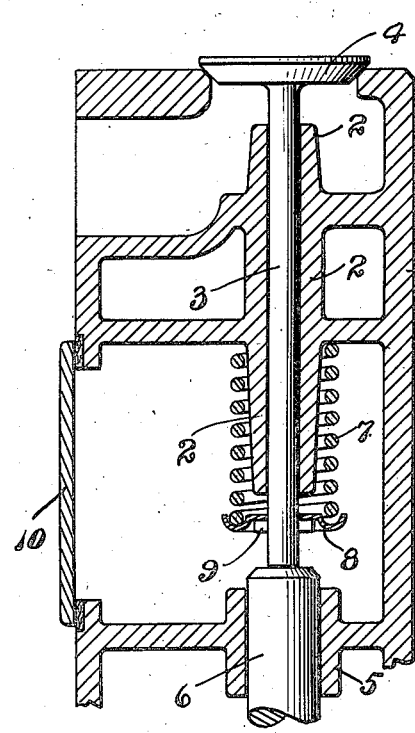
Fig. 1.
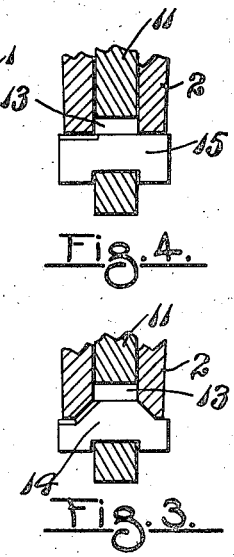
Fig. 4.
Fig. 3.
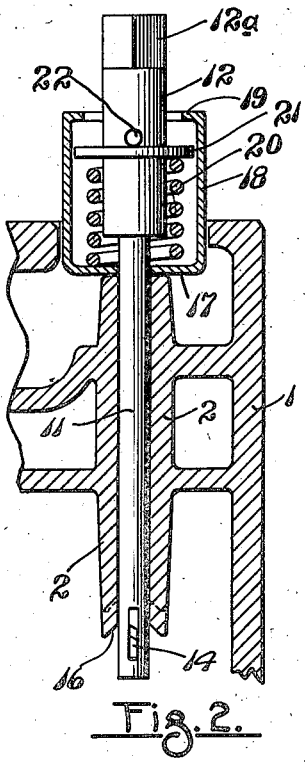
Fig. 2.
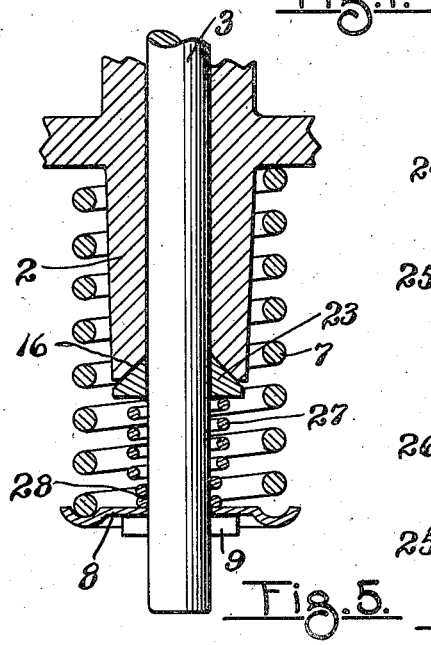
Fig. 5.
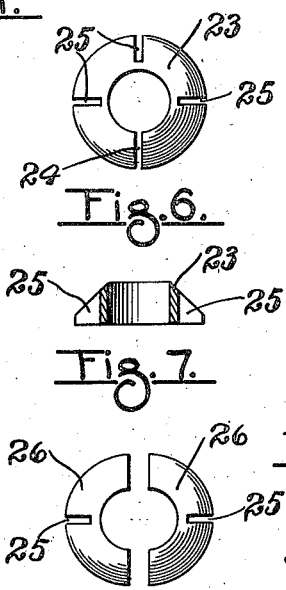
Fig. 6.
Fig. 7.
Fig. 8.
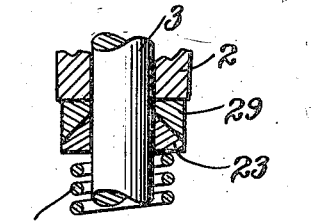
Fig. 9.
Fig. 10.
Inventor
Charles E. Johnson
By Lineance
and
Van Antwerp
Attorneys Nov. 24, 1936.                C. E. JOHNSON                2,061,874
                         METHOD OF VALVE STEM PACKING
                    Filed Sept. 10, 1934        2 Sheets-Sheet 2

Inventor
Charles E. Johnson
By Liverance &
Van Antwerp
Attorneys

Patented Nov. 24, 1936

2,061,874

UNITED STATES PATENT OFFICE 2,061,874

METHOD OF VALVE STEM PACKING

Charles E. Johnson, North Muskegon, Mich., assignor to Sealed Power Corporation, Muskegon, Mich., a corporation of Michigan Application September 10, 1934, Serial No. 743,414

2 Claims. (Cl. 29—156.7)

This invention relates to the packing of valve stems, more specifically to packing for the valve stems in internal combustion engines. The invention is concerned with a simple and practical internal combustion engine valve stem packing, and a novel method of installing the same on the stems of such valves.

The valve stems of valves in internal combustion engines are mounted for reciprocatory movements through substantially cylindrical guides. Wear both on the stem and the guide in service and particularly at the high speeds of engines now substantially universally employed in automotive work produces space between the sides of the stem and walls of the guide through which oil is drawn into the cylinder above the piston, on the intake or suction strokes of the pistons. Exceedingly fine design of piston rings is resorted to to eliminate so-called "blow-by" and reduce to an absolute minimum the waste of oil which may come from its passage between piston rings upwardly to the combustion chamber. Such insurance against waste of oil passing the piston rings must be further supplemented by eliminating, as much as possible, a waste of oil by reason of its being drawn through any enlarged passage worn between the valve stem and its guide, particularly the valves which control the intake of fuel mixture into the engine cylinders.

The replacement of worn piston rings is common in engines for the purpose of conserving and saving oil and for sustaining compression. In like manner it is very desirable that passage of oil between the valve stem and its guide be insured to eliminate waste of oil which, in engines which have been in service for a considerable time, cannot be wholly corrected by regrinding cylinders and putting in oversized pistons with new piston rings, or by replacing worn piston rings by new piston rings.

With my invention and the method which I have perfected it is designed that the valve stem shall be equipped with a packing, preferably of a metallic character, located around the stem at the lower end of the valve stem guide. In order to install a piston ring packing at such portion of the valve stem guide in most engines now made for automobiles it is necessary to cut away a portion of the valve stem guide at its lower end in order to provide space for the packing. Heretofore in practice it has been usual to install valve stem packings at the upper end of the valve stem guides. Various practical considerations make such location of packing very undesirable and though the same has been used practically, it has been only because of lack of a better packing and of ability to install the same at the lower end of the valve stem guide.

My invention is concerned with and directed to a method of installation which permits the packing to be installed at the lower end of the valve stem guide and, further, to use a very simple, practical and cheap packing of a nature such that it automatically conforms to the valve stem; and any wear on the valve stem or on the packing is automatically taken up, thus insuring a prevention of oil passage into the valve stem guide so that oil will not pass to the engine cylinder even though a considerable wear has occurred on the valve stem or its guide or both.

An understanding of the invention may be had from the following description taken in connection with the accompanying drawings, in which, Fig. 1 is a fragmentary vertical section illustrating the installation and mounting of a valve stem in an engine block.

Fig. 2 is a similar section showing the tool which I have provided and which may be used to cut away the lower end of the valve stem guide.

Fig. 3 is a fragmentary enlarged section showing a form of cutter mounted at the lower end of such tool for cutting away the lower end of the valve stem guide and at the same time providing a conical seat for the packing used.

Fig. 4 is a similar fragmentary section illustrating another type of cutter for providing a flat seat at the lower end of the valve stem guide.

Fig. 5 is a fragmentary enlarged section showing the packing installed after the lower end of the valve stem guide has been properly machined.

Fig. 6 is a plan view of one form of packing which may be used.

Fig. 7 is a transverse section therethrough.

Fig. 8 is a plan of another form of packing which may be used.

Fig. 9 is a fragmentary section illustrating one manner in which a packing may be installed wherein the lower end of the valve stem guide has a flat seat.

Fig. 10 is an under plan view of a continuous ring having a conical underside which provides a seat for the packing and which may be used in installing the packing as in Fig. 9.

Like reference characters refer to like parts in the different figures of the drawings.

Figure 11:
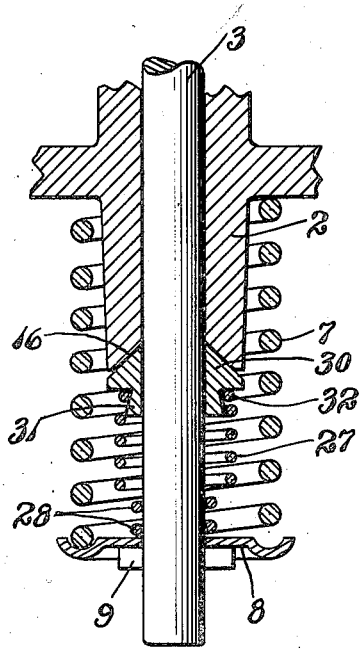
Fig. 11 is a view similar to Fig. 5 illustrating an improvement in the form and in the manner of holding the packing.

The engine block 1 has a valve guide 2 therein with a valve stem 3 extending downwardly through the valve guide, which stem carries a valve 4 at its upper end. A cylindrical guide 5 for a tappet or lifter 6 is used, the lower end of the stem 3 bearing upon the upper end of the tappet 6 as shown. The valve is normally held in closed position, and is returned to closed position after it has been lifted, through a heavy coiled compression spring 7 located around the lower end of the guide 2 and bearing at its upper end against a horizontal web of the engine block. The lower end of the spring is supported by a metal disk 8 which is located around the lower end portion of the stem 3 and held by a pin 9 passing through the stem below the part 8, as shown in Figs. 1 and 5.

This construction is common and well known in internal combustion engines particularly those used in automotive work. Access to the spring 7, the pin 9 and the spring supporting member 8 is had through an opening in the side of the engine block normally closed by a plate 10 which may be detached when necessary.

In the construction of automobile engines, the distance between the lower end of the valve stem guide 2 and the upper end of the tappet 6 is normally not great, varying from approximately one-fourth of an inch to one-half of an inch, and of course, being less when the tappet is lifted to move the valve to open position. This has heretofore precluded the practical packing of the valve stems at the lower ends of their guides. With my invention the valve 4 and its stem 3 are removed by taking off the cover plate 10 and driving out the pin 9, whereupon the valve 4 with its stem 3, spring 7 and the supporting plate 8 may be readily removed, and a tool for cutting away a portion of the guide 2 at its lower end inserted and operated.

In Fig. 2 the tool which I have devised for this purpose is shown in connection with a valve stem guide. The tool comprises a rod 11 passing downwardly through the guide 2, which rod extends from an enlarged cylindrical shank 12 the upper end of which may be squared, as shown at 12a. The rod 11 adjacent its lower end has a transverse opening 13 through which a cutter, such as indicated at 14 in Fig. 3, or at 15 in Fig. 4, may be passed. The cutter at its lower edge has an elongated recess or notch which fits over the metal of the rod 11 at the lower edge of the opening 13, the cutter being thus locked with the rod 11 so that it must turn therewith. The cutter at 14 is shown of a form such that it cuts a conical recess 16 in the lower end of the guide 2 while cutting away the lower end portion of said guide. The cutter 15 forms a flat face or seat at the lower end of the guide 2 while cutting away the lower end portion thereof.

A sheet metal member of the cup-like form shown in Fig. 2 having a bottom 17, a vertical cylindrical wall 18 with inturned prongs 19 at the upper end of said wall is located on the rod 11 and extends upwardly around the shank 12 as shown. A heavy coiled compression spring 20 is located within said member bearing against the bottom 17 at its lower end and against a ring or washer 21 which is located within said cuplike member and held against upward movement by a pin 22 which passes through the shank 12.

It is evident that after the valve has been removed from the structure shown in Fig. 1, this tool may be placed in the position shown in Fig. 2 with the bottom 17 of the sheet metal member against the upper end of the guide 2. Then by pressing downwardly upon the upper end of the shank 12, spring 20 is compressed to bring the opening 13 in the rod 11 below the lower end of the guide 2, whereupon the proper cutter, 14 or 15, may be inserted through said opening. Release of pressure upon the upper end of the shank 12 permits spring 20 to draw the cutter against the lower end of the guide 2. Then by applying a wrench or other suitable tool to the squared end 12a of the shank 12 the tool may be turned, and with it the cutter 14 or 15 used, resulting in a machining away of the lower end of the guide 2 until the washer 21 reaches the prongs 19. These prongs 19 stop the washer 21 when sufficient material has been cut away from the lower end of the guide 2.

The packing used preferably is of a metallic character, such as bronze or any other metal suitable for packing purposes. In Fig. 6 is shown one form of the packing which consists of a ring 23 having a conical upper face divided or parted at one side, as at 24, and with radial slots 25 cut inwardly from the outer edges. Another form of packing consists of two semi-circular halves 26, having conical upper surfaces, the same as the previously described packing, each half having a slot 25 therein, as shown in Fig. 8. The slots and the partings permit the packing to follow the surface of the valve stem 3 when installed thereon as shown in Fig. 5. The conical upper surface of the packing fits against the conical recess at 16 which is made by the cutter 14.

As shown in Fig. 3, after the valve stem guide has been machined and its lower end cut off as much as necessary, the valve is replaced, the packing placed over the stem 3 against the lower end of the guide 2 and with the conical upper surface of the packing seated in the conical recess 16. A spring 27 is placed over the lower end of the valve stem 3 and moved upwardly against the packing. This spring 27 is a coiled spring of less strength than the valve spring 7. At its lower end it is formed with one or two coils 28 which snugly engage the valve stem 3 so that when the packing 23 has been placed in position and the spring 27 brought against it the spring holds itself and the packing in place. The lower end 28 of the spring 27 likewise bears against the plate 8 as shown in Fig. 5. This compresses spring 27 which exerts its force upon the packing 23 which is forced into the recess at 16 and contracted until it bears against the valve stem.

When the lower end of the guide 2 is machined by a cutter such as 15 in Fig. 4 to have a flat face, an additional member 29 is used in installing the packing. The member 29 is a continuous ring having an opening so that it may pass over the valve stem 3 and with a flat upper side to bear against the flat face at the lower end of the guide 2. The underface of the ring 29 is conical and like the conical recess 16 made by the cutter 14. The ring 29 is placed against the lower end of the guide and the packing 23 (or the two part packing 26) installed against the same and received in the conical recess, as shown in Fig. 9, the spring 27 bearing against the lower side of the packing.

Figure 12:
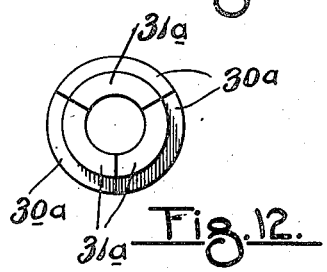
Figs. 12 and 13 are underplan views of two forms of packing which may be used with the construction shown in Fig. 11.
Figure 13:
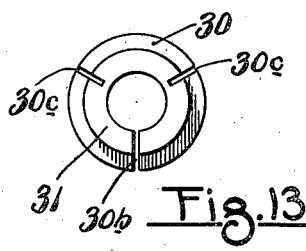

In Fig. 11 the packing 23 is replaced by a packing 30 having a lower projection 31. The upper part of the packing 30 has a conical surface to fit the recess 16, while the projection 31, of smaller diameter than the base of the packing 30, has sides inclined to a lesser degree outwardly and downwardly over which one or more upper coils 32 of the spring 27 may be snapped, thus retaining the parts of the packing in place around the stem 3. The packing, as shown in Fig. 12, may be made of a plurality of sections with upper enlarged portions 30a and lower parts 31a of smaller diameter, or the packing may be as shown in Fig. 13, divided at one side at 30b and having radial notches 30c cut nearly therethrough from the outer edges toward the central opening. The upper coils 32 of the spring 27 serve to hold sections of the packing together or to aid in pressing the same with a light degree of pressure against the stem 3.

Figure 14:
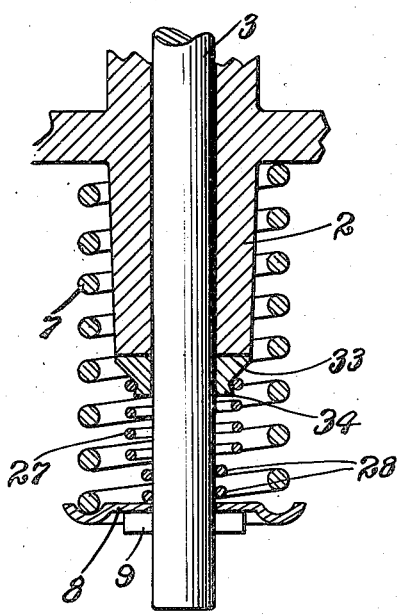
Fig. 14 is a section similar to Fig. 11 wherein the packing is placed against a flat seat.

In Fig. 14 the lower end of the guide 2 is machined to have a flat face. The packing 33 in such case has a downward projection 34 over which an upper coil of the spring 27 is snapped, also bearing against the downwardly and inwardly inclined sides of the larger upper end portion of the packing, thus tending to move the same inwardly so as to bear against the stem 3.

The method of packing a valve stem disclosed herein is simple, practical and readily performed. The packing of valve stems at the lower ends of their guides is performed in a practical manner; and the lengths of the valve stem guides and the short distances between the same and the valve lifters or tappets is taken care of by a simple and easily performed machining operation.

The invention is defined in the appended claims.

I claim:

1. The method of packing an internal combustion engine valve stem, said stem passing through an elongated guide, said stem and guide both being worn whereby their axes are not necessarily identical, which consists, in removing the valve and its stem from the engine, inserting a rotatable shaft completely through said guide and equipping the same at its inner or lower end with a cutter, rotating the shaft at its outer or upper end and exerting a yielding outward force on said shaft to bring the cutter against the inner end of the guide to provide a seat at the inner end of the guide, removing said shaft and cutter, replacing the valve and valve stem, locating a packing around the valve stem at the lower end of the guide and maintaining the same against the seat at the lower end of the guide and into engagement with and around the valve stem.

2. The method set forth in claim 1 but further characterized by the step of gradually decreasing the yielding outward force on said shaft for the purpose described.

CHARLES E. JOHNSON.